US012568129B2

(12) United States Patent
Wen et al.

(10) Patent No.: US 12,568,129 B2
(45) Date of Patent: Mar. 3, 2026

(54) INTERACTION METHOD FOR TERMINAL, AND ELECTRONIC WHITEBOARD AND NON-TRANSITORY COMPUTER-READABLE STORAGE MEDIUM

(71) Applicant: BOE Technology Group Co., Ltd., Beijing (CN)

(72) Inventors: Ken Wen, Beijing (CN); Yangyang Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 23 days.

(21) Appl. No.: 18/037,357

(22) PCT Filed: Nov. 18, 2020

(86) PCT No.: PCT/CN2020/129867
§ 371 (c)(1),
(2) Date: May 17, 2023

(87) PCT Pub. No.: WO2022/104606
PCT Pub. Date: May 27, 2022

(65) Prior Publication Data
US 2023/0412657 A1 Dec. 21, 2023

(51) Int. Cl.
*G06F 40/30* (2020.01)
*G06F 3/0486* (2013.01)
(Continued)

(52) U.S. Cl.
CPC .......... *H04L 65/403* (2013.01); *G06F 3/0486* (2013.01); *G06F 3/04883* (2013.01);
(Continued)

(58) Field of Classification Search
CPC ....... H04L 51/04; H04L 65/403; G06F 40/30; G06F 3/0486; G06F 3/04883; G06F 40/174
See application file for complete search history.

(56) References Cited

U.S. PATENT DOCUMENTS 9,773,051 B2 * 9/2017 Smith ................. G06F 16/1824
11,669,534 B2 * 6/2023 Mano ................. G06F 16/4393
707/769
(Continued)

FOREIGN PATENT DOCUMENTS

CN 102611818 A 7/2012
CN 203870835 U 10/2014
(Continued)

OTHER PUBLICATIONS

International Search Report and Written Opinion in PCT/CN2020/129867, mailed Aug. 16, 2021, 6 pages.
(Continued)

*Primary Examiner* — Scott T Baderman
*Assistant Examiner* — Mario M Velez-Lopez
(74) *Attorney, Agent, or Firm* — ArentFox Schiff LLP; Michael Fainberg

(57) ABSTRACT

An interaction method for a terminal, and an electronic whiteboard and a non-transitory computer-readable storage medium. The terminal includes at least one electronic whiteboard. The interaction method for a terminal comprises: identifying and acquiring information recorded in an electronic whiteboard (S101); according to the acquired information, obtaining information to be sent (S102); and according to a user operation instruction, sending the information to be sent to a target object (S103).

12 Claims, 3 Drawing Sheets

S201 — Each activity in a conference is performed in sequence

S202 — Conference information recorded in the electronic whiteboard is identified and acquired S203 — Different sentences in the conference information are grouped, where each group corresponds to a to-do list S204 — The importance levels of the to-do lists are sorted S205 — Conference minutes including the sorted to-do lists are obtained S206 — A target object matching the to-be-sent conference minutes is determined S207 — The to-do lists in the conference minutes matching the target object are dragged to the user head portrait of the target object, to send the to-do lists; or the to-do lists matching the target object is sent through a mailbox or chat software

(51) Int. Cl.

| | |
|---|---|
| *G06F 3/04883* | (2022.01) |
| *G06F 40/174* | (2020.01) |
| *H04L 51/04* | (2022.01) |
| *H04L 65/403* | (2022.01) |

(52) U.S. Cl.
CPC ............ *G06F 40/174* (2020.01); *G06F 40/30* (2020.01); *H04L 51/04* (2013.01)

(56) References Cited

U.S. PATENT DOCUMENTS

| | | | |
|---|---|---|---|
| 12,367,870 B2 * | 7/2025 | Grossmann ............. | G10L 15/22 |
| 2005/0018906 A1 * | 1/2005 | Napper ................ | G06V 30/244 |
| | | | 382/224 |
| 2005/0104864 A1 * | 5/2005 | Zhang ................ | G06V 30/1423 |
| | | | 345/173 |
| 2009/0027480 A1 * | 1/2009 | Choi ...................... | H04N 7/147 |
| | | | 348/14.02 |
| 2010/0037167 A1 * | 2/2010 | Son ....................... | G06F 3/0486 |
| | | | 715/769 |
| 2014/0149880 A1 | 5/2014 | Farouki | |
| 2015/0066501 A1 * | 3/2015 | Thapliyal ............ | G06F 16/5846 |
| | | | 704/235 |
| 2016/0117349 A1 * | 4/2016 | Segaran ................ | G06F 16/215 |
| | | | 707/803 |
| 2017/0011227 A1 | 1/2017 | Tse et al. | |
| 2018/0063332 A1 | 3/2018 | Ishiyama et al. | |
| 2018/0232352 A1 * | 8/2018 | Fulford .................... | G09B 5/00 |
| 2018/0285059 A1 * | 10/2018 | Zurek ..................... | G06F 40/35 |
| 2019/0108221 A1 * | 4/2019 | Nelson .................... | G10L 15/26 |
| 2019/0318020 A1 * | 10/2019 | Chauhan ............. | G06F 11/0709 |

FOREIGN PATENT DOCUMENTS

| | | |
|---|---|---|
| CN | 104869348 A | 8/2015 |
| CN | 105100372 A | 11/2015 |
| CN | 106326343 A | 1/2017 |
| CN | 106888269 A | 6/2017 |
| CN | 107731028 A | 2/2018 |
| CN | 107733666 A | 2/2018 |
| CN | 108053350 A | 5/2018 |
| CN | 109474763 A | 3/2019 |
| CN | 110989903 A | 4/2020 |
| CN | 111355920 A | 6/2020 |
| JP | 2004-112638 A | 4/2004 |
| JP | 2005266980 A | 9/2005 |

OTHER PUBLICATIONS

MAXHUB, "Can the intelligent electronic whiteboard touch handwriting? MAXHUB Conference Tablet Brings You the Most Complete Dry Goods," MAXHUB Conference Tablet, Feb. 2020, Retrieved from Internet: <https://jingyan.baidu.com/article/a681b0dedffe5f7a19434605.html>, 6 pages.

Whiteboard Functions in a Mobile Teleconference System for Homecare Services, Proceeding of the Fourth International Conference on Computer and Information Technology,2004 IEEE.

Extended European Search Report and Written Opinion in EP 20961897.4, mailed Nov. 3, 2023.

Cagliero Luca et al, "VISA, A supervised approach to indexing video lectures with semantic annotations", 2019 IEEE 43rd Annual Computer Software and Applications Conference (COMPSAC), IEEE, vol. 1, Jul. 15, 2019, pp. 226-235.

Pao Siangliulue et al "Idea Hound Improving Large-scale Collaborative Ideation with Crowd-powered Real-time Semantic Modeling" User Interface Software and Technology, Oct. 16, 2016, pp. 609-624.

Office Action received for Chinese Patent Application No. 202080002867.4, mailed on Dec. 19, 2024, 24 pages (15 pages of English Translation and 9 pages of Original Document).

\* cited by examiner

S201

Each activity in a conference is performed in sequence

S202

Conference information recorded in the electronic whiteboard is identified and acquired

S203

Different sentences in the conference information are grouped, where each group corresponds to a to-do list

S204

The importance levels of the to-do lists are sorted

S205

Conference minutes including the sorted to-do lists are obtained

S206

A target object matching the to-be-sent conference minutes is determined

S207

The to-do lists in the conference minutes matching the target object are dragged to the user head portrait of the target object, to send the to-do lists; or the to-do lists matching the target object is sent through a mailbox or chat software

Fig. 4

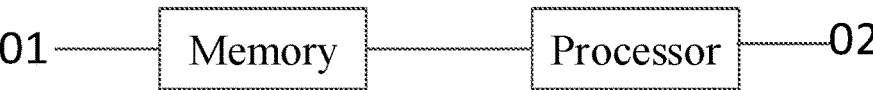

01 —— Memory —— Processor —— 02

Fig. 5

INTERACTION METHOD FOR TERMINAL, AND ELECTRONIC WHITEBOARD AND NON-TRANSITORY COMPUTER-READABLE STORAGE MEDIUM

CROSS-REFERENCE TO RELATED APPLICATIONS

The disclosure is a National Stage of International Application No. PCT/CN2020/129867, filed on Nov. 18, 2020, which is hereby incorporated by reference in their entireties.

FIELD

The present disclosure relates to the field of electronic technology, and in particular to an interaction method for a terminal, an electronic whiteboard, and a non-transitory computer-readable storage medium.

BACKGROUND

A conference whiteboard generally functions to record the conference content with a writing board and notes. After the conference, the conference content is manually collated to form conference minutes before being sent, but the intelligence degree of an entire process from recording the conference content, collating the conference minutes to sending the conference minutes needs to be improved, resulting in poor user experience.

SUMMARY

The present disclosure provides an interaction method for a terminal. The terminal includes at least one electronic whiteboard, and the method includes:

identifying and acquiring information recorded in the electronic whiteboard, and acquiring text information from the information;

obtaining to-be-sent information according to the acquired information; and sending the to-be-sent information to at least one target object according to a user operation instruction.

In some embodiments, the information recorded in the electronic whiteboard includes at least one of:

text information displayed in the electronic whiteboard, written text information in a writing area of the electronic whiteboard, or voice information in a current interaction scene.

In some embodiments, the writing area includes: a writing interface of the electronic whiteboard, or at least one note interface established in the writing interface;

where the identifying and acquiring the written text information in the writing area of the electronic whiteboard specifically includes:

identifying and acquiring the written text information recorded in the writing interface and the written text information recorded in the note interface.

In some embodiments, the obtaining to-be-sent information according to the acquired information includes:

grouping the acquired information, to acquire at least one information group; and obtaining the to-be-sent information including the at least one information group.

In some embodiments, the grouping the acquired information specifically includes:

selecting at least part of the text information in the information displayed in the electronic whiteboard as an information group according to the user operation instruction.

In some embodiments, in a case that the identified information includes the text information, the grouping the acquired information specifically includes:

performing semantic analysis on the text information, and distributing sentences with semantic correlation in the text information into an information group.

In some embodiments, in a case that the acquired information further includes the voice information, before grouping the acquired information, the method further includes:

converting the voice information into text information;

where the performing semantic analysis on the text information, and the distributing sentences with semantic correlation in the text information into an information group specifically includes:

processing the acquired text information and the text information converted from the voice information through a machine learning method, performing semantic analysis on the acquired text information and the text information converted from the voice information, merging sentences with same semantics in the acquired text information and the text information converted from the voice information into one sentence, and distributing the sentences with semantic correlations in the text information into an information group.

In some embodiments, in a case that the acquired information includes only the voice information, the grouping the acquired information specifically includes:

converting the voice information into text information; and performing semantic analysis on the text information, and distributing sentences with semantic correlation in the text information into an information group.

In some embodiments, in a case that the acquired information includes the written text information, the grouping the acquired information specifically includes:

processing the written text information through handwriting identification, and forming an information group from sentences with same handwriting in the written text information.

In some embodiments, in a case that the writing area of the electronic whiteboard includes note interfaces, the method further includes:

acquiring association information between the note interfaces;

where the grouping the acquired information specifically includes:

forming an information group from the information in the note interfaces having an association.

In some embodiments, the to-be-sent information includes a plurality of information groups, and after the obtaining the to-be-sent information including the plurality of information groups, the method further includes:

determining importance levels of the plurality of information groups; and sorting the plurality of information groups according to an order of the importance levels from high to low.

In some embodiments, the sending the to-be-sent information to the at least one target object according to a user operation instruction specifically includes:

determining the at least one target object; and sending the at least one information group to the at least one target object according to the user operation instruction.

In some embodiments, the determining at least one target object specifically includes:

taking all participants in a current interaction scene as target objects; or determining the at least one target object corresponding to the to-be-sent information from all participants in a current interaction scene.

In some embodiments, the determining the at least one target object corresponding to the to-be-sent information from all participants in the current interaction scene specifically includes:

selecting the at least one target object corresponding to the to-be-sent information according to the user operation instruction; or processing the to-be-sent information, and determining the at least one target object matching the to-be-sent information.

In some embodiments, the electronic whiteboard further includes a user information area, and the user information area includes a user head portrait; and the sending the to-be-sent information matching the target object to the target object according to the user operation instruction specifically includes:

dragging the to-be-sent information to the user head portrait of the target object matching the to-be-sent information, to send the to-be-sent information to the target object corresponding to the user head portrait; or sending the to-be-sent information to the target object matching the to-be-sent information through a mailbox or a chat tool.

An embodiment of present disclosure provides an electronic whiteboard, including:

a memory and a processor;

where the processor is configured to execute the interaction method for a terminal provided in the embodiments of the present disclosure.

An embodiment of present disclosure provides a non-transitory computer-readable storage medium, including a memory, where the memory is configured to store an instruction, and the instruction is executed by a processor to enable a device including the readable storage medium to execute the interaction method for a terminal provided in the embodiment of the present disclosure.

BRIEF DESCRIPTION OF THE DRAWINGS

FIG. 4 is a schematic diagram of another interaction method for a terminal according to an embodiment of the present disclosure.

FIG. 5 is a schematic diagram of an electronic whiteboard according to an embodiment of the present disclosure.

DETAILED DESCRIPTION OF THE EMBODIMENTS

Figure 1:
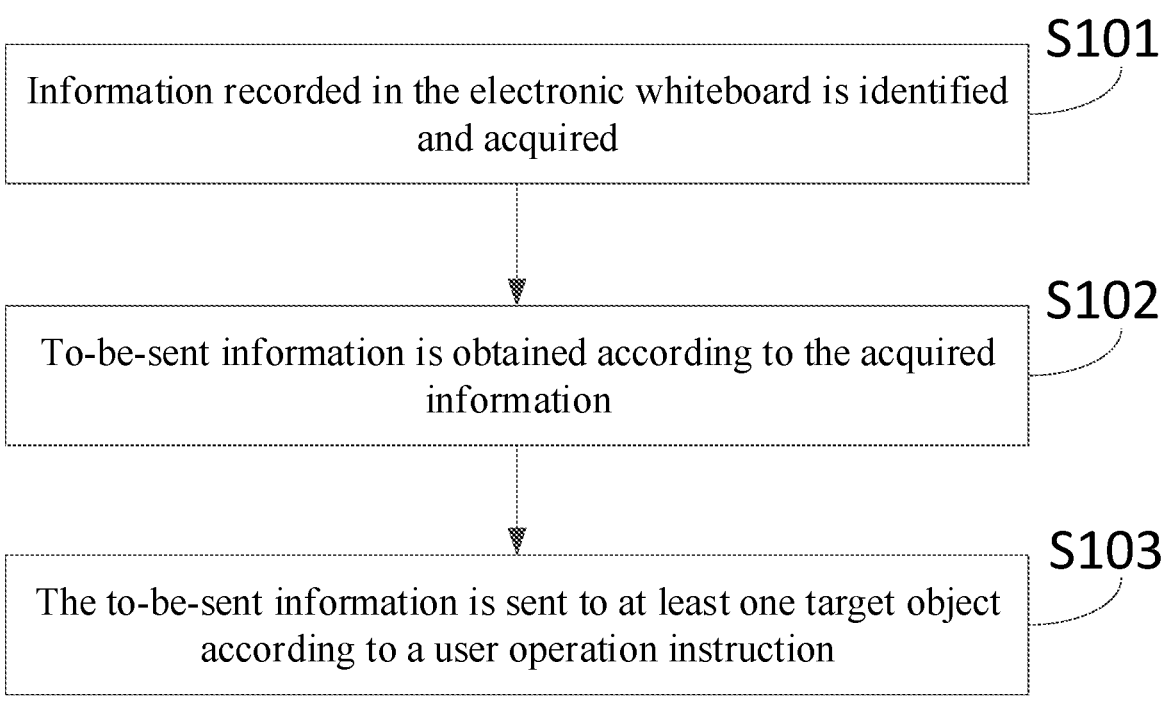
FIG. 1 is a schematic diagram of an interaction method for a terminal according to an embodiment of the present disclosure.

According to an interaction method for a terminal, the terminal includes at least one electronic whiteboard. As shown in FIG. 1, the method includes the following.

S101, information recorded in the electronic whiteboard is identified and acquired.

S102, to-be-sent information is obtained according to the acquired information.

S103, the to-be-sent information is sent to at least one target object according to a user operation instruction.

According to the interaction method for a terminal provided in the embodiments of the present disclosure, the information recorded in the electronic whiteboard is acquired, the to-be-sent information is generated according to the acquired text information, and then the to-be-sent information is sent to the target object according to the user operation instruction. Thus, the interaction between a user and the terminal is flexible, the interaction between the user and the terminal is highly intelligent, and the user experience may be improved.

It is to be noted that the terminal provided in the embodiments of the present disclosure may be applied to, for example, a conference scene. In particular, the to-be-sent information may be conference minutes. The conference minutes may include, for example, at least one to-do list. Certainly, the terminal provided in the embodiments of the present disclosure may also be applied to a brainstorming scene, and the to-be-sent information may include an idea of each participant. Certainly, the terminal provided in the embodiments of the present disclosure may also be applied to a teaching scene, and the to-be-sent information may be, for example, teaching blackboard-writing.

It is to be noted that the electronic whiteboard is a display device having a touch control module. The electronic whiteboard may have functions of showing, writing, recording, sharing, etc. The electronic whiteboard may, for example, show pictures, PowerPoint (PPT) or other documents that the user has prepared in advance. The user may also write in the electronic whiteboard, and in particular, may write independently of displayed information, or may annotate the displayed information, etc. In the current interaction scene, the user may also trigger a recording function of the electronic whiteboard at the beginning of an activity, such that the current activity may be recorded or videotaped. When a plurality of electronic whiteboards are included in the current interaction scene, the electronic whiteboards may establish a communication connection in a wireless manner, for example, a wireless local area network connection, a Wi-Fi connection, etc., and real-time interaction of participants in the current interaction scene may be achieved.

In some embodiments, the information recorded in the electronic whiteboard includes at least one of: text information displayed in the electronic whiteboard, written text information in a writing area of the electronic whiteboard, or voice information in a current interaction scene.

In some embodiments, the written text information includes, for example, text, graffiti, etc. The graffiti include information such as circles, underlines, symbols, etc.

It is to be noted that the information recorded in the electronic whiteboard in different interaction scenes may be different during specific implementation. As for a certain interaction scene, the electronic whiteboard may also trigger a recording function besides displaying and writing, to acquire the text information displayed in the electronic whiteboard, the written text information in the writing area of the electronic whiteboard and the voice information in the current interaction scene, so as to avoid missing other types of important information when only acquiring a single type of information. For example, acquiring the voice information may avoid missing important information not recorded by the displayed text information and the written text information.

Figure 2:
FIG. 2 is a schematic diagram of an electronic whiteboard according to an embodiment of the present disclosure.

In some embodiments, as shown in FIG. 2, the writing area of the electronic whiteboard 1 includes: a writing interface 2 of the electronic whiteboard, or at least one note interface 3 established in the writing interface 2.

The step of identifying and acquiring the written text information in the writing area of the electronic whiteboard specifically includes:

identifying and acquiring the written text information recorded in the writing interface and the written text information recorded in the at least one note interface.

Certainly, under the condition that the user does not establish a label in the writing interface, that is, only the writing interface includes the written text information, the written text information recorded in the writing interface is directly acquired.

In some embodiments, the step of acquiring written text information recorded in the note interface includes any one of the following modes: mode 1: the written text information recorded in different layers in the note interface is embedded into the writing interface; and mode 2: according to the user operation instruction, the written text information recorded in the layer specified by the user in the note interface is embedded into the writing interface.

It is to be noted that when the user writes information in the electronic whiteboard, when a note interface is established in the writing interface, the note interface may include a plurality of layers, and information generated at different time periods is automatically distributed into different layers. For example, if a generation time interval between information is longer than two minutes, newly generated information generates a new layer.

In some embodiments, the written text information recorded in the layer in the specified note is embedded into the writing interface area according to the user operation instruction. For example, the written text information recorded in a layer specified by the user is embedded into the writing interface area.

It is to be noted that operations by the user on the note include generating a new note, copying a note, deleting a note, combining notes, etc. Specifically, an existing note may be divided into two notes after a cutting gesture; and text to be copied is circled by drawing a circle, and then a new note is copied for the circled text.

In some embodiments, the step S102 of obtaining to-be-sent information according to the acquired information specifically includes the following.

S1021, the acquired information is grouped, to acquire at least one information group.

S1022, the to-be-sent information including the at least one information group is obtained.

According to the interaction method for a terminal provided in the embodiments of the present disclosure, the acquired information may be automatically classified and grouped, to obtain the to-be-sent information, such that the intelligent degree of collation of the to-be-sent information may be improved, and the user experience is further enhanced.

In some embodiments, the step of grouping the acquired information specifically includes: selecting at least part of the text information in the information displayed in the electronic whiteboard as an information group according to the user operation instruction.

During specific implementation, the user operation instruction may be, for example, an operation that a user draws part of information displayed in the electronic whiteboard by using a rectangular frame, the content drawn by the rectangular frame serves as the to-be-sent information, and subsequently, the content drawn by the rectangular frame may be directly sent to the target object. Certainly, the user operation instruction may also be an operation of marking a line, and may also be an operation of associating information with an arrow or other images or symbols. That is, in the interaction method for a terminal provided in the embodiments of the present disclosure, the acquired information may be manually grouped by the user.

In some embodiments, when the acquired information includes the text information, the step of grouping the acquired information specifically includes: performing semantic analysis on the text information, and distributing sentences with semantic correlation in the text information into an information group.

In some embodiments, the text information is processed through a machine learning method, semantic analysis is performed on the text information, and sentences with semantic correlation in the text information are distributed into an information group. That is, the interaction method for a terminal provided in the embodiments of the present disclosure may automatically group the acquired information through the machine learning method.

During specific implementation, the machine learning method may be, for example, a deep learning method. The step of performing semantic analysis on the text information, and distributing sentences with semantic correlation in the text information into an information group specifically includes:

processing the text information through the deep learning method, performing semantic analysis on the text information, dividing all the text information into a plurality of sentences, processing each of the sentences through a text classification model, and distributing the sentences with semantic correlation into an information group.

In some embodiments, when the acquired information includes the voice information, before grouping the acquired information, the method further includes: converting the voice information into text information.

During specific implementation, for example, the voice information may be processed through the machine learning method, to convert the voice information into text information.

During specific implementation, the voice information may be processed through, for example, the deep learning method. Specifically, signal processing is performed on the voice information, and the signal-processed information is decoded by a decoder based on an acoustic model and a language model, to obtain the text information, such that the voice information may be converted into the text information. After the voice information is converted into the text information, the text information may still be processed through the deep learning method.

In some embodiments, when the acquired information includes only the voice information, the grouping the acquired information specifically includes:

performing semantic analysis on the text information; and distributing sentences with semantic correlation in the text information into an information group.

In some embodiments, the step of performing semantic analysis on the text information specifically includes: processing the text information through a machine learning method, and performing semantic analysis on the text information.

In some embodiments, when the acquired information includes both the text information and the voice information, the step of performing semantic analysis on the text information, and distributing sentences with semantic correlation in the text information into an information group specifically includes:

processing the acquired text information and the text information converted from the voice information through a machine learning method, performing semantic analysis on the acquired text information and the text information converted from the voice information, merging sentences with same semantics in the acquired text information and the text information converted from the voice information into one sentence, and distributing sentences with semantic correlations in the text information into an information group.

It is to be noted that in the voice information of the current interaction scene, there may be voice information corresponding to directly acquired text information, and there may also be voice information different from the directly acquired text information. For example, when the current interaction scene is a conference scene, there may be a case of dictating a to-do list displayed in the electronic whiteboard, or a case of orally conveying a task which is not displayed in the electronic whiteboard. Collating directly acquired text information and text information converted from voice may avoid the loss of important information. When there is voice information corresponding to the directly acquired text information, the directly acquired text information and the voice information which have a corresponding relation may be integrated, so as to avoid duplicate information in the to-be-sent information. When there is voice information different from the directly acquired text information, the interaction method for a terminal provided in the embodiments of the present disclosure may obtain the most complete to-be-sent information corresponding to the current interaction scene by collating the directly acquired text information and the voice information. In some embodiments, when the acquired information includes the written text information, the grouping the acquired information further includes:

processing the written text information through handwriting identification, and forming an information group from sentences with same handwriting in the written text information.

During specific implementation, handwriting identification may adopt, for example, a machine learning method; and the machine learning method may be, for example, a deep learning method. As for the current application scene, when the user writes in the electronic whiteboard, the terminal records handwriting of the user and inputs the handwriting into a preset handwriting identification model, such that sentences with the same handwriting in the interaction scene are grouped into an information group, and then the handwriting of the information group is matched with the recorded handwriting, to determine a user corresponding to each information group. For example, in a brainstorming scene, determining the user corresponding to each information group may determine the responsible person corresponding to each idea.

In some embodiments, when the writing area of the electronic whiteboard includes note interfaces, the interaction method for a terminal further includes: acquiring association information between the note interfaces; and the grouping the acquired information specifically includes: forming an information group from the information in the note interfaces having an association.

An establishment method of the association between the note interfaces may be a method of mind map, such that when a new note is established, a relation with the previously established notes may be displayed, and the association information between the notes may be acquired while the information recorded in the electronic whiteboard is detected and acquired.

In some embodiments, when the to-be-sent information includes a plurality of information groups, and after obtaining the to-be-sent information including the plurality of information groups, the interaction method for a terminal further includes:

determining an importance level of each of the information groups; and sorting the plurality of information groups according to an order of the importance levels from high to low.

According to the interaction method for a terminal provided in the embodiments of the present disclosure, the importance levels of to-be-sent information may be sorted, and then the sorted information may be sent to the target object. Especially, for a conference scene, when each information group corresponds to a to-do list, the to-do lists sorted according to the importance levels are sent to the target object, and the target object may clearly know the importance degree of each to-do list, so as to arrange a schedule according to the importance degree.

During specific implementation, the importance level of each information group is determined, for example, the number of preset keywords included in each information group may be identified; and the greater the number of preset keywords in each information group is, the higher the importance level of the information group is. During specific implementation, for a specific interaction scene, a keyword library matching the interaction scene may be preset. Or, voice information may be processed through a machine learning method, to obtain tone information corresponding to the voice information, and an importance level of an information group corresponding to the voice information is determined according to the tone size of the voice information. The greater the tone of the voice information is, the higher the importance level of the information group corresponding to the voice information is. The tones of the voice information corresponding to sentences in each information group may be sorted. Whether a keyword is included in the voice information corresponding to each sentence may also be identified, to sort the tones of the keywords. Or, whether a sentence in the information group includes an emphasis mark may also be identified, and the importance level of the information group including the emphasis mark is higher than the importance level of the information group including no emphasis mark. During specific implementations, the emphasis mark may be, for example, an emphasis symbol or underline, etc.

In some embodiments, the step S103 of sending the to-be-sent information to at least one target object according to the user operation instruction specifically includes the following.

S1031, at least one target object is determined.

S1032, at least one information group is sent to the at least one target object according to the user operation instruction.

In some embodiments, the step S1031 of determining at least one target object specifically includes:

taking all participants in a current interaction scene as the target objects; or determining the at least one target object corresponding to the to-be-sent information from all participants in a current interaction scene.

It is to be noted that as for the current interaction scene, for example, a participant of the current interaction scene may be added by mailbox acquisition, adding a user name, scanning a two-dimensional code, etc. During specific implementation, the to-be-sent information needs to be sent to at least one participant of the current interaction scene, that is, the participants of the current interaction scene include at least one target object corresponding to the to-be-sent information group.

During specific implementation, all to-be-sent information may be sent to all participants in the current interaction scene. Or, at least one target object may be determined from all the participants in the current interaction scene, that is, all the to-be-sent information may be sent to some participants in the current interaction scene. Or, a responsible object is determined from all the participants in the current interaction scene, and information matching the responsible object in the to-be-sent information is sent to the responsible object.

During specific implementations, for a conference scene, the target object may be, for example, a department leader in conference participants. For a brainstorming scene, the target object may be a responsible person for each idea. For a teaching scene, the target object may be each student participating in a teaching activity.

In some embodiments, the step S1031 of determining the at least one target object corresponding to the to-be-sent information from all participants in the current interaction scene specifically includes:

selecting the at least one target object corresponding to the to-be-sent information according to the user operation instruction.

In some embodiments, a project leader may serve as the target object, and the user may send information of each information group in the to-be-sent information to the corresponding leader. In some embodiments, the target object corresponding to the to-be-sent information may also be determined by the user. During specific implementation, when the user selects at least part of text information in the information displayed in the electronic whiteboard as an information group, the target object corresponding to the information group may be directly determined by the user, and the information is sent to the target object.

Or, in some embodiments, the step S1031 of determining the at least one target object corresponding to the to-be-sent information from all participants in the current interaction scene specifically includes:

processing the to-be-sent information, and determining the at least one target object matching the to-be-sent information.

During specific implementation, the to-be-sent information may be processed through a machine learning method, and the target object matching the to-be-sent information may be determined. The machine learning method is, for example, a deep learning method.

According to the interaction method for a terminal provided in the embodiments of the present disclosure, the to-be-sent information and the target object may automatically be matched, to further improve the intelligent degree of interaction of the terminal, and to improve the user experience.

In some embodiments, the step of processing the to-be-sent information, and determining the responsible object matching the to-be-sent information specifically includes:

processing the to-be-sent information through a machine learning method; identifying whether the responsible object is included in the to-be-sent information; and when the responsible object is included in the to-be-sent information, determining the responsible object corresponding to the to-be-sent information, and taking the responsible object as the target object.

Taking a current interaction scene being a conference scene as an example, the to-be-sent information may include task information and information about a responsible object corresponding to the task information; and the information about the responsible object may be, for example, name information. During specific implementation, when it is identified that the to-be-sent information includes name information of a current participant through the machine learning method, the responsible object of the to-be-sent information may be determined.

Or, in some embodiments, the step of determining the responsible object matching the to-be-sent information specifically includes:

processing the to-be-sent information through a machine learning method according to preset responsibilities and expertise services of all participants in the current interaction scene, determining a responsibility and an expertise service matching the to-be-sent information, determining a responsible object matching the to-be-sent information, and taking the responsible object as the target object.

During specific implementation, for example, the to-be-sent information may be processed through the deep learning method, semantic analysis is performed on the to-be-sent information, and the responsibility and the expertise service matching the to-be-sent information are determined, such that the responsible object matching the to-be-sent information may be determined.

According to the interaction method of a terminal provided in the embodiments of the present disclosure, the target objects of the to-be-sent information may automatically be matched according to pre-recorded responsibilities and expertise services of participants. In this way, the to-be-sent information may automatically match the responsibilities and expertise services of the target objects according to preset rules, so as to further improve the intelligent degree of the interaction of the terminal, and to improve the user experience.

During specific implementation, a target object matching each information group in the to-be-sent information may be determined.

Figure 3:
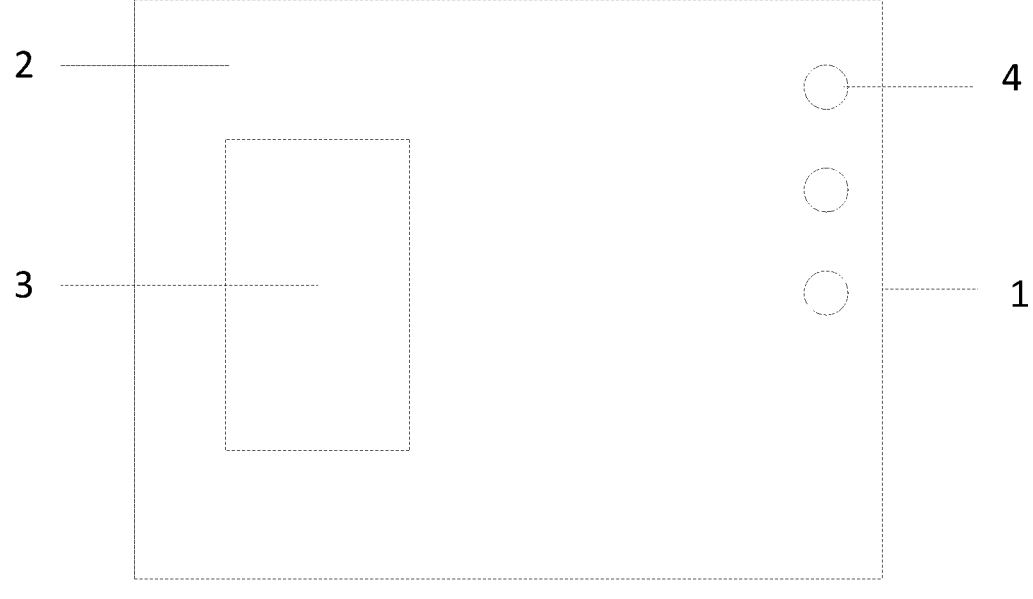
FIG. 3 is a schematic diagram of another electronic whiteboard according to an embodiment of the present disclosure.

In some embodiments, as shown in FIG. 3, the electronic whiteboard further includes a user information area 4, and the user information area includes a user head portrait; and the sending the to-be-sent information matching the target object to the target object according to the user operation instruction specifically includes any one of the following modes: mode 1: the to-be-sent information is dragged to the user head portrait of the target object matching the to-be-sent information, to send the to-be-sent information to the target object corresponding to the user head portrait; and mode 2: the to-be-sent information is sent to the target object matching the to-be-sent information through a mailbox or a chat tool.

It is to be noted that as for a current interaction scene, after a participant of the current interaction scene is added, information about the participant may be obtained. The information about the participant may include, for example, a user name of the participant, a mailbox or other contact information of the participant; and a head portrait of the participant in the current interaction scene may be displayed in the user information area of the electronic whiteboard. In some embodiments, the electronic whiteboard may also include mailbox software or other chat software. The electronic whiteboard software may be associated with the mailbox software or other chat software, such that to-be-sent information may be sent to the target object matching the to-be-sent information through a mailbox or a chat tool.

During specific implementation, the user operation instruction may be, for example, an operation that the user drags the to-be-sent information. The user operation instruction may also be an operation that the user triggers an activity end operation, and the to-be-sent information is sent to the target object matching the to-be-sent information through a mailbox or a chat tool while the user triggers the activity end operation.

During specific implementation, when the acquired information is manually grouped by the user, after at least part of text information in the information displayed in the electronic whiteboard is selected as an information group according to the user operation instruction, the user may directly drag the selected text information to a user head portrait of a target object matching the information, and thus send the selected information to the target object matching the selected information. Certainly, the selected text information may also be sent to the target object matching the selected information through a mailbox or chat tool.

During specific implementation, after the acquired information is automatically grouped and the to-be-sent information and the target object are automatically matched, the user may drag the to-be-sent information to the user head portrait of the target object matching the information, so as to send the to-be-sent information to the target object matching the to-be-sent information. Certainly, the to-be-sent information may also be sent to the target object matching the to-be-sent information through a mailbox or a chat tool.

In some embodiments, before identifying and acquiring information recorded in the electronic whiteboard, the method further includes:

setting a duration corresponding to each activity in the current interaction scene according to a preset time schedule; and triggering an activity reminder when an activity starts and when a remaining duration of the activity is less than a preset value.

According to the interaction method for a terminal provided in the embodiments of the present disclosure, an activity reminder may be set according to the duration corresponding to each activity in the interaction scene, to improve activity efficiency.

During specific implementation, the electronic whiteboard may also have a countdown function. Triggering an activity reminder may, for example, trigger a countdown at the beginning of the activity, and it's set to trigger the reminder at the beginning and ending of the countdown.

In some embodiments, the method further includes:

identifying whether time information is included in the to-be-sent information; and in a case that the to-be-sent information includes the time information, synchronizing the time information and information corresponding to the time information to a schedule module in the terminal while the target object receives the to-be-sent information.

In this way, schedule software may remind the user according to the time information. For example, when the information sent to the user includes task information, the user may be reminded to complete the task as soon as possible before the time information corresponding to the task information.

Taking an interaction scene being a conference scene as an example, the interaction method for a terminal provided in the embodiments of the present disclosure is illustrated. As shown in FIG. 4, the interaction method for a terminal includes the following.

S201, each activity in a conference is performed in sequence.

During the conference, related information of the conference may be displayed in an electronic whiteboard, participants may write the related information of the conference in the electronic whiteboard, and may also trigger a recording function of the electronic whiteboard to record the conference. Specifically, the participant may directly write conference information in a writing board of the electronic whiteboard, or create a note in the writing board to write the conference information in the note; and when a participant establishes a plurality of notes, an association between the notes may also be established.

S202, conference information recorded in the electronic whiteboard is identified and acquired.

S203, different sentences in the conference information are grouped, where each group corresponds to a to-do list.

Specifically, the different sentences in the conference information may be grouped according to the degree of semantic association, the degree of association between handwriting, whether association information is established between notes, etc., and a user may manually divide some contents in the conference information into a to-do list. Specifically, when the acquired information includes a corresponding relation between the time information and the text information, the time information of the to-do list is determined according to the corresponding relation between the time information and the text information.

S204, the importance levels of the to-do lists are sorted.

S205, conference minutes including the sorted to-do lists are obtained.

S206, a target object matching the to-be-sent conference minutes is determined.

Specifically, all participants in the current conference scene may be taken as target objects; or, some participants in the current conference scene may also be taken as target objects. Specifically, the user may determine target objects matching the to-do lists according to the specific content of the to-do lists in the conference minutes, may also identify the name information of the participants in the to-do lists through a machine learning method, and may also match the to-do lists with the responsibilities and the expertise services of the participants through a machine learning method, to determine the target objects matching the to-do lists.

S207, the to-do lists in the conference minutes matching the target object are dragged to the user head portrait of the target object, to send the to-do lists; or the to-do lists matching the target object is sent through a mailbox or chat software.

When the conference minutes received by the target object include the time information of the to-do lists, the time information of the to-do lists is synchronized to a schedule of the terminal of the target object, so as to remind the user to complete the to-do lists on time.

Based on the same inventive concept, embodiments of the present disclosure further provide an electronic whiteboard, as shown in FIG. 5, including: a memory 01 and a processor 02; where the processor is configured to execute the interaction method for a terminal provided in the embodiments of the present disclosure.

In some embodiments, the processor may be a central processing unit, an application specific integrated circuit (ASIC), or one or more integrated circuits configured to control execution of programs.

In some embodiments, the memory may include a read-only memory (ROM), a random access memory (RAM), and a magnetic disk storage. The memory is configured to store data required when the processor is running, that is, store a computer program executable by the processor. The processor executes the above interaction method for a terminal provided in the embodiments of the present disclosure by executing the computer program stored in the memory. One or more memories are provided, and one or more processors are provided.

An embodiment of present disclosure further provides a non-transitory computer-readable storage medium, including a memory, where the memory is configured to store an instruction, and the instruction is executed by a processor to enable a device including the readable storage medium to execute the interaction method provided in the embodiments of the present disclosure.

According to the interaction method for a terminal, the electronic whiteboard and the non-transitory computer-readable storage medium provided in the embodiments of the present disclosure, the information recorded in the electronic whiteboard is acquired, the to-be-sent information is generated by collating the acquired text information, and then the to-be-sent information is sent to the target object according to the user operation instruction. Thus, the interaction between a user and the terminal is flexible, the interaction between the user and the terminal is highly intelligent, and the user experience may be improved.

Those skilled in the art will appreciate that embodiments of the present disclosure can be provided as a method, system, or computer program product. Thus, the present disclosure can take the form of an entire hardware embodiment, an entire software embodiment or an embodiment combining software and hardware aspects. Furthermore, the present disclosure can take the form of a computer program product implemented on one or more computer-available storage media (including but not limited to a magnetic disk memory, a compact disc read-only memory (CD-ROM) an optical memory, etc.) encompassing computer-available program codes.

The present disclosure is described with reference to flowcharts and/or block diagrams of a method, an apparatus (system), and a computer program product according to the embodiments of the present disclosure. It will be understood that each flow and/or block of the flowcharts and/or block diagrams, and combinations of flows and/or blocks in the flowcharts and/or block diagrams can be implemented by computer program instructions. These computer program instructions can be provided for a processor of a general purpose computer, a special-purpose computer, an embedded processor, or other programmable data processing devices to generate a machine, such that the instructions, which are executed by the processor of the computer or other programmable data processing devices, can generate apparatuses for implementing functions specified in one or more flows in the flowcharts and/or one or more blocks in the block diagrams.

These computer program instructions can also be stored in a computer-readable memory that can direct the computers or other programmable data processing devices to work in a particular manner, such that the instructions stored in the computer-readable memory generate an article of manufacture including an instruction apparatus that implements the functions specified in one or more flows in the flowcharts and/or one or more blocks in the block diagrams.

These computer program instructions can also be loaded onto the computers or other programmable data processing devices to execute a series of operational steps on the computers or other programmable devices so as to generate a process implemented by the computers, such that the instructions that are executed by the computers or other programmable devices provide steps for implementing the functions specified in one or more flows in the flowcharts and/or one or more blocks in the block diagrams.

While the preferred embodiments of the present disclosure have been described, additional alterations and modifications to those embodiments may be made by those skilled in the art once the basic inventive concept is apparent to those skilled in the art. Thus, the appended claims are intended to be interpreted to include the preferred embodiments and all alterations and modifications that fall within the scope of the present disclosure.

It will be apparent to those skilled in the art that various modifications and variations can be made to the embodiments of the present disclosure without departing from the spirit and scope of the embodiments of the present disclosure. Thus, if modifications and variations to the embodiments of the present disclosure fall within the scope of the appended claims of the present disclosure and their equivalents, the present disclosure is intended to encompass such modifications and variations as well.

What is claimed is:

1. An interaction method for a terminal, wherein the terminal comprises at least one electronic whiteboard, and the method comprises:

identifying and acquiring information recorded in the electronic whiteboard;

grouping the acquired information, to acquire at least one information group; and obtaining to-be-sent information comprising the at least one information group; and sending the to-be-sent information to at least one target object according to a user operation instruction;

wherein the information recorded in the electronic whiteboard comprises at least one of: text information displayed in the electronic whiteboard, written text information in a writing area of the electronic whiteboard, or voice information;

wherein in a case that the acquired information further comprises the text information and the voice information, before grouping the acquired information, the method further comprises:

converting the voice information into text information;

wherein the method further comprises:

processing the acquired text information and the text information converted from the voice information through a machine learning method;

performing semantic analysis on the acquired text information and the text information converted from the voice information;

merging sentences with duplicate information in the acquired text information and the text information converted from the voice information into one sentence, by removing the duplicate information in the acquired text information and the text information converted from the voice information; and distributing the sentences with semantic correlations in the text information into an information group.

2. The method according to claim 1, wherein the writing area comprises: a writing interface of the electronic whiteboard, or at least one note interface established in the writing interface;

wherein the identifying and acquiring the written text information in the writing area of the electronic whiteboard specifically comprises:

identifying and acquiring the written text information recorded in the writing interface or the written text information recorded in the at least one note interface.

3. The method according to claim 1, wherein the grouping the acquired information specifically comprises:

selecting at least part of the text information in the information displayed in the electronic whiteboard as an information group according to the user operation instruction.

4. The method according to claim 1, wherein in a case that the acquired information comprises the written text information, the grouping the acquired information specifically comprises:

processing the written text information through handwriting identification, and forming an information group from sentences with same handwriting in the written text information.

5. The method according to claim 1, wherein in a case that the writing area of the electronic whiteboard comprises note interfaces, the method further comprises:

acquiring association information between the note interfaces;

wherein the grouping the acquired information specifically comprises:

forming an information group from the information in the note interfaces having an association.

6. The method according to claim 1, wherein the to-be-sent information comprises a plurality of information groups; and after the obtaining the to-be-sent information comprising the plurality of information groups, the method further comprises:

determining importance levels of the plurality of information groups; and sorting the plurality of information groups according to an order of the importance levels from high to low.

7. The method according to claim 1, wherein the sending the to-be-sent information to the at least one target object according to the user operation instruction specifically comprises:

determining the at least one target object; and sending the at least one information group to the at least one target object according to the user operation instruction.

8. The method according to claim 7, wherein the determining at least one target object specifically comprises:

taking all participants in a current interaction scene as target objects; or determining the at least one target object corresponding to the to-be-sent information from all participants in a current interaction scene.

9. The method according to claim 8, wherein the determining the at least one target object corresponding to the to-be-sent information from all participants in the current interaction scene specifically comprises:

selecting the at least one target object corresponding to the to-be-sent information according to the user operation instruction; or processing the to-be-sent information, and determining the at least one target object matching the to-be-sent information.

10. The method according to claim 7, wherein the electronic whiteboard further comprises a user information area; and the user information area comprises a user head portrait;

wherein the sending the to-be-sent information matching the target object to the target object according to the user operation instruction specifically comprises:

dragging the to-be-sent information to the user head portrait of the target object matching the to-be-sent information, to send the to-be-sent information to the target object corresponding to the user head portrait; or sending the to-be-sent information to the target object matching the to-be-sent information through a mailbox or a chat tool.

11. An electronic whiteboard, comprising:

a memory and a processor;

wherein the processor is configured to execute the method according to claim 1.

12. A non-transitory computer-readable storage medium, comprising a memory, wherein the memory is configured to store an instruction; and the instruction is executed by a processor to enable a device comprising the readable storage medium to execute the method according to claim 1.

* * * * *